(12) United States Patent
Stoltz (10) Patent No.: US 9,711,042 B2
(45) Date of Patent: Jul. 18, 2017

(54) METHOD AND A MODULE FOR CONTROLLING PIECES OF EQUIPMENT BY SOUND PULSE

(71) Applicant: Vincent Stoltz, Paris (FR)

(72) Inventor: Vincent Stoltz, Paris (FR)

( * ) Notice: Subject to any disclaimer, the term of this patent is extended or adjusted under 35 U.S.C. 154(b) by 0 days.

(21) Appl. No.: 14/434,883

(22) PCT Filed: Sep. 30, 2013

(86) PCT No.: PCT/FR2013/052317
§ 371 (c)(1),
(2) Date: Apr. 10, 2015

(87) PCT Pub. No.: WO2014/057188
PCT Pub. Date: Apr. 17, 2014

(65) Prior Publication Data
US 2015/0302740 A1    Oct. 22, 2015

(30) Foreign Application Priority Data

Oct. 11, 2012   (FR) ..................... 12 59721

(51) Int. Cl.
*G08C 23/02* (2006.01)
*G01S 3/808* (2006.01)
*G06F 3/16* (2006.01)
*G05B 15/02* (2006.01)

(52) U.S. Cl.
CPC ............ *G08C 23/02* (2013.01); *G01S 3/8083* (2013.01); *G05B 15/02* (2013.01); *G06F 3/167* (2013.01)

(58) Field of Classification Search
CPC ... H04R 2430/20; G01S 3/8083; G01S 11/14; G01S 3/80; G01S 3/8003; G01S 3/802; G01S 5/18; G08C 23/02; G08B 15/02; G06F 3/167
See application file for complete search history.

(56) References Cited

U.S. PATENT DOCUMENTS

| 2002/0167862 A1 | 11/2002 | Tomasi et al. |
| 2010/0188929 A1* | 7/2010 | Kitaura ................. G06F 1/1605 367/13 |
| 2012/0026837 A1* | 2/2012 | Li ......................... G01S 3/8086 367/127 |

FOREIGN PATENT DOCUMENTS

EP          2 211 337         7/2010

OTHER PUBLICATIONS

Search Report dated Jan. 13, 2014 from International Application No. PCT/FR2013/052317 filed Sep. 30, 2013, pp. 1-4.

* cited by examiner

*Primary Examiner* — Curtis Odom
(74) *Attorney, Agent, or Firm* — MH2 Technology Law Group, LLP (57) ABSTRACT

Disclosed are methods and devices for controlling pieces of equipment by sound pulses, which include operations and means for determining characteristics of a vector defined by two sound pulses received by at least two receivers. In various implementations, the characteristics may comprise at least the direction and possibly also the sense and the norm of the vector, and these sound pulses may be generated in a zone defined relative to the receivers. The methods and devices may also include operations and means for controlling a piece of equipment where the command applied to the equipment may be determined at least by the direction of the vector.

16 Claims, 8 Drawing Sheets

METHOD AND A MODULE FOR CONTROLLING PIECES OF EQUIPMENT BY SOUND PULSE

CROSS-REFERENCE TO RELATED APPLICATIONS

This application is a U.S. National Stage application of PCT/FR2013/052317 filed Sep. 30, 2013, which claims priority to French Application No. 1259721 filed Oct. 11, 2012, the entire disclosures of which are hereby incorporated by reference in their entireties.

BACKGROUND OF THE INVENTION

The present invention, relates to controlling pieces of equipment by sound pulses.

Various methods exist in the prior art for controlling pieces of equipment by sound pulses, where the sound pulses may be produced by a user by clapping the hands or snapping the fingers.

In U.S. Pat. No. 8,189,430, the user claps the hands in order to select between different commands for a TV set. The control system is based on a receiver having two sound sensors. When the user claps the hands and emits a sound clap, the receiver uses the difference between clap travel times to calculate an angular direction relative to an axis passing halfway between the two sensors. This angular direction serves to determine which command is to be executed by the TV set. That system presents several drawbacks.

Firstly, the sound clap receiver containing the sound sensors is incorporated in the appliance that is to be controlled, such that the sensors are relatively close together, being about one meter apart at most. That particular arrangement and the bandwidth used for the frequency band of the sound pulse require the user to occupy a distance that is more or less fixed (i.e. not too close, not too far away, and substantially directly in front) relative to the piece of equipment that is to be controlled, so that any uncertainty about the angular direction remains reasonable.

Thereafter, performing that method makes it necessary to filter out the noise generated by the piece of equipment being controlled and thus to have knowledge about the characteristics of that noise. Unfortunately, such filtering is ineffective for ensuring that the receivers operate properly in the presence of other sources of disturbing sounds, for example human voices. In practice, when the equipment is used in a home environment, in particular when the equipment is a TV set, it is located in a zone that is noisy.

Furthermore, that system does not make it possible with only two sound claps to select one piece of equipment that is to be controlled from a plurality of pieces of equipment, but only to select one command from two possible commands for that piece of equipment.

That system also does not make it possible to define different commands as a function of the zone in which the sound claps are made.

Likewise, it is not possible to define subzones in which sound claps are not to be taken into account, i.e. do not generate any command, so as to exclude zones from which noise pollution is too great.

Finally, when using two receivers, the number of different commands capable of being generated by two sound pulses is limited to two when using two receivers; in any event, the number of commands cannot be greater than the number of receivers.

OBJECT AND SUMMARY OF THE INVENTION

The present invention seeks in particular to solve the above-mentioned drawbacks of the prior art.

More precisely, in a first aspect, the invention provides a method of controlling equipment by sound pulse, the method comprising:

a step of determining at least the direction of a vector defined by two sound pulses received by at least two receivers, the sound pulses being generated in a zone that is defined relative to the receivers; and a command step of issuing a command determined at least by the direction of the vector, and serving to control at least one piece of equipment.

In corresponding manner, the invention also provides a module for controlling equipment by sound pulse, which module is suitable for being incorporated in a receiver, the module comprising:

means for communicating with another receiver; and means for determining at least the direction of a vector defined by two sound pulses received by the receivers, the sound pulses being generated in a zone defined by the receivers.

The invention also provides a receiver comprising:

at least one sound pulse sensor; and a module as mentioned above for controlling pieces of equipment by sound pulse.

In an embodiment, the receiver further comprises control means for controlling at least one piece of equipment, the applied command being determined at least by the direction of the vector.

If the means for communication between the receiver and the pieces of equipment that are to be controlled are themselves bidirectional, then in the event of the receiver receiving acknowledgment from the piece of equipment that the command has been properly received, the receiver can present this information to the user, e.g. by switching on a visual indicator.

The invention also provides a system for controlling equipment by sound pulse, the system comprising a first receiver as mentioned above together with at least one other receiver:

at least one sound pulse sensor;

means for determining a characteristic of the sound pulse; and communication means suitable for transmitting information obtained from the characteristic to the first receiver, which information may be the characteristic itself.

The invention also provides a command reception and processor outlet for receiving and processing commands emitted by a module for controlling pieces of equipment by sound pulse as mentioned above, the outlet comprising:

means for communication with the module;

means for interpreting the command emitted by the module; and means for controlling at least one secondary piece of equipment.

The invention also provides a system for controlling equipment by sound pulse as described above and comprising at least one command reception and processor outlet as described above.

In this document, the concept "sound pulse" covers any sound signal that presents the following characteristics:

duration not exceeding 400 milliseconds (ms);

maximum acoustic amplitude greater than the mean acoustic level; and optionally, a large part of its energy lying in the frequency range higher than 3.5 kilohertz (kHz) preferably higher than 4 kHz.

In particular, in a preferred embodiment, the sound pulses in the meaning of the invention may be sound claps, and in particular claps of the hands, or snaps of the fingers.

The commands of the invention may be analog or digital in kind.

They are determined at least by the direction of a vector having ends that correspond to the sources of the sound pulses.

In addition, and in very advantageous manner, the commands may also be determined by taking account not only of direction but also of the sense and also possibly of the norm of the vector defined by the sources of the two sound pulses.

In very advantageous manner, the control method, the control module, the receiver, and the control system of the invention can be used to control pieces of equipment that are positioned independently of the receivers.

In particular, the invention makes it possible for the receivers to be spaced apart from one another so as to increase the accuracy with which the positions of the sources of the sound pulses are determined.

In addition, there is no need for the user to occupy a defined distance from the piece of equipment in order to control it, since the only important feature is the relative positioning of the user and the receivers. In the invention, the receivers may be positioned in one or more zones that are silent.

It is no longer necessary for the pieces of equipment to be placed in the same zone as where the sound pulses are generated.

Furthermore, the invention makes it possible to control a number of pieces of equipment that is greater than the number of receivers.

In addition, and in very advantageous manner, it should be observed that the invention requires two sound pulses to be detected in order to generate any one command; this characteristic makes it possible to avoid a command being generated in unexpected manner when a single noise occurs that presents the characteristics of a sound pulse.

In a particular implementation of the invention, the control method of the invention includes a step of validating the vector from the distance between the pulses and from their difference in time.

This particular characteristic makes it possible to avoid an unwanted command being generated in the event of two noises presenting the characteristics of a sound pulse being:

either generated by sources that are spaced apart by a distance lying outside the validation ranges;

or else separated in time by a duration that lies outside the validation ranges.

In other words, commands generated by the invention are generated after two sound pulses have been generated that are separated in position and in time in compliance with characteristics defined in the validation ranges. In practice, these ranges are selected so that the two sound pulses can be generated by a single person clapping the hands or snapping the fingers, or striking a metal surface with an object; the time validation range may be of the order of a few seconds, and the position validation range may be of the order of a few tens of centimeters.

The invention has two main variants.

In a first variant of the invention, there is no need to determine the position(s) of the receivers relative to each other, nor the positions of the pieces of equipment relative to the receivers.

In an implementation of this first variant, the method of the invention is performed by two receivers, one of which is a reference receiver, and each of which has a sound pulse sensor.

In this implementation, the direction and the sense of the vector are determined by determining the travel differences in the travel times of each of the two sound pulses going from their respective sources to the receivers. This determination of travel time differences may make use of characteristic instants at which the sound pulses are received by the receivers. In most advantageous manner, in this implementation, the reference receiver may generate two commands on the basis of the sign of the above-mentioned difference, for example one command for switching on the pieces of equipment that are to be controlled, and the other command for switching it off. In practice, if the user is located between the two receivers and emits two consecutive sound pulses from right to left or from left to right, then two different vectors will be generated that are associated with two distinct commands.

In a second variant of the invention, the absolute positions of the receivers and of the sound pulses, and also the direction and possibly the sense of the vector are determined in an orthonormal reference frame having one of its axes defined by two receivers. For a receiver that has only one sound sensor, the position of the receiver in the reference frame corresponds to the position of the sensor. For a receiver having two sound sensors, the position of the receiver in the reference frame corresponds to the midpoint between the two sensors. The positions of the receivers in the room can be selected freely by the user; the only constraint is that when there are three receivers, they must not be in alignment. Naturally, the user may optionally be guided in order to place the receivers in an optimum configuration.

In this second variant, the direction and optionally the sense and the norm of the vector are determined by the coordinates of the vector in this reference frame, in other words by the positions of the sound pulse sources.

This variant advantageously makes it possible to use more than two commands.

The initialization step of the second variant of the invention makes it possible to define the absolute positions of the receivers in the orthonormal reference frame. For this purpose, a characteristic noise is emitted at a receiver and the positions of the receivers in said reference frame are determined by calculating the differences of the characteristic instants at which this noise is received at the receivers.

In this particular implementation, the characteristic noises may be emitted by striking a metal surface with an object, for example. These characteristic noises present the characteristics of a sound pulse while being shorter in duration. They thus enable travel time difference to be determined more accurately.

It is mentioned above that the characteristic noises should be generated at the receivers; in an implementation, these characteristic noises are emitted by respective devices internal to each of the receivers.

In accordance with the invention, it is necessary to define the commands and the commanded pieces of equipment as a function of the directions and possibly also of the senses of the vectors. Commands and commanded pieces of equipment are defined during the step of configuring the system.

By way of example, in an implementation of the second variant, it is possible to define, in the reference frame, fixed, directions, or fixed-direction-plus-sense pairs, each of these fixed directions or each of these fixed-direction-plus-sense pairs being associated with a particular command for one or more particular pieces of equipment.

In a particular implementation of the second variant, a configuration step of the method also makes it possible to define the position of a piece of equipment in the reference frame. This characteristic advantageously makes it possible to have an implementation of the invention in which the user controls a piece of equipment by generating two sound pulses defining a vector of direction and sense that point to these pieces of equipment in question.

For example, in this implementation, the user may turn towards one particular piece of equipment, and generate two successive sound pulses that are aligned on a direction going to that piece of equipment in order to control it, e.g. switch it off or on.

In this implementation, it is also possible to define directions for controlling a plurality of pieces of equipment.

For example, when the user emits two consecutive pulses in alignment on a direction that does not point to any piece of equipment, then all of the controlled pieces of equipment are switched on or off.

In accordance with the invention, only sound pulses generated in the zone that is defined relative to the receivers are taken into account. In a particular implementation of the invention, it is possible during the configuration step to define a plurality of zones in which sound pulses may be generated and to associate different commands within those zones for a given vector.

In a particular implementation of the invention, it is possible during the configuration step to define a subzone in the above-mentioned zones and in which sound pulses are not taken into account; by way of example, the subzone may constitute a zone that is particularly noisy in the environment of the invention.

The above-mentioned zones and subzone may foe defined by emitting sound pulses or characteristic noises, by detecting those sound pulses or characteristic noises in each of the receivers, and by calculating the positions of the sound pulses or of the characteristic noises in the reference frame.

In a particular implementation, the positions of the above-mentioned zones and subzones may be defined by using the man-machine interface of a terminal, e.g. of a smartphone.

This second variant of the invention presents two main implementations.

In a first implementation, the coordinates of the vector are determined by using the sound signal received by two receivers, each of which has two sound pulse sensors.

In another implementation of this second variant, during the step of determining the coordinates of the vector, the method of the invention makes use of the sound signal received by at least three receivers, each having at least one sound pulse sensor.

Various methods may be used for determining the coordinates of the vector in this second implementation of the second variant of the invention.

In particular, in order to determine the coordinates of the vector, it is possible to make use of the characteristic instants at which sound pulses are received by each of the receivers.

The characteristic instants used for calculating a travel time difference in the first variant or for determining the coordinates of the vector in the second variant result from a method of processing the signal; they may be obtained by normalizing the envelope of the sound signal and then retaining the instant at which the amplitude of the normalized signal exceeds a determined threshold.

These characteristic instants constitute characteristics of the sound pulse in the meaning of the invention.

The advantage of normalizing the signal is to make calculation of the characteristic instant at which a sound pulse is received invariant from one receiver to another. The amplitude of the sound pulse as measured at each receiver may differ significantly given the reduction in the amplitude of the pulse with increasing propagation distance. The value of the characteristic receive instant would therefore differ if the method used involved observing a fixed, amplitude threshold being crossed without performing normalization.

Naturally, when the system of the invention has more than three sensors, it is possible to use similar methods on triplets of sensors and to make combinations, e.g. statistical combinations, of the results in order to improve accuracy concerning the positions of sound pulses. This approach is most advantageous, in particular when there is an obstacle, e.g. the body of a user, that is positioned between one of the sensors in a triplet and the places where sound pulses are emitted.

In a particular implementation, the control method has a step of filtering sound pulses, which may have a spectrum extending from a few hundreds of hertz (Hz) to more than 20 kHz. The filtering step may include a highpass filter with a cutoff frequency higher than or equal to 3.5 kHz, and preferably higher than or to 4 kHz, or a lowpass filter with a cutoff frequency selected as a function of the ambient noise to be discriminated in the medium, e.g. 15 kHz. The highpass filter serves advantageously to discriminate between the signal and voice noises, which have a frequency band that lies for the most part below 3.5 kHz, whereas the lowpass filter advantageously makes it possible specifically to eliminate high frequencies, in particular of radiofrequency type.

In a particular implementation, it is possible to use a third sound pulse for enriching the command as determined from the first two sound pulses.

BRIEF DESCRIPTION OF THE DRAWINGS

Particular advantages and characteristics of the present invention appear from the following detailed description made with reference to the figures, in which:

FIG. 5A shows a second implementation of the invention in the second variant;

FIG. 5B shows the main steps of the methods performed in the receivers of FIG. 6A; and FIG. 5C is a diagram for determining zones in which sound pulses are taken into account by using a smart phone in the second implementation described with reference to FIG. 6A.

DETAILED DESCRIPTION OF A PLURALITY OF IMPLEMENTATIONS OF THE INVENTION

Figure 1:
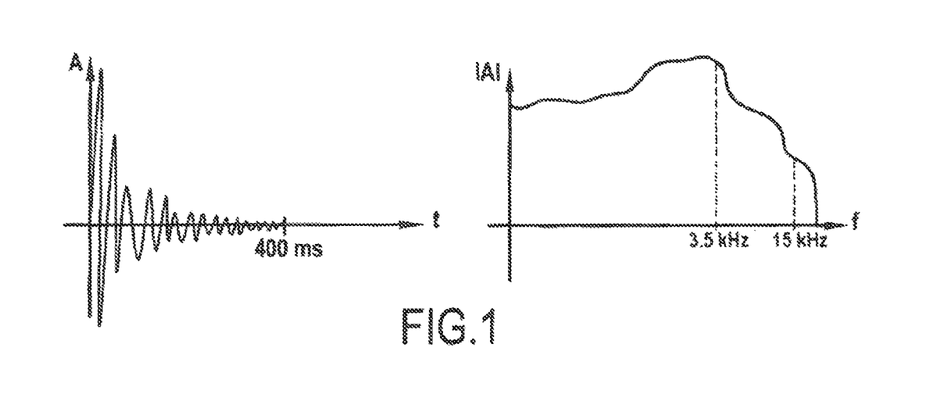
FIG. 1 shows a sound pulse in the meaning of the invention.

FIG. 1 shows a sound pulse in the meaning of the invention. As can be seen from its time spectrum, the sound pulse comprises a range of frequencies. As a result, bandpass filtering in the range 3.5 kHz or 4 kHz to 15 kHz has no major influence on the envelope of the sound pulse signal and makes it possible to discriminate better between the useful signal of the sound pulse and ambient noise such as voices or high frequencies. It is therefore possible to filter the signal while conserving sufficient information in the sound pulse in order to determine with sufficient accuracy the instant characteristic of its reception, for example.

Figure 2A:
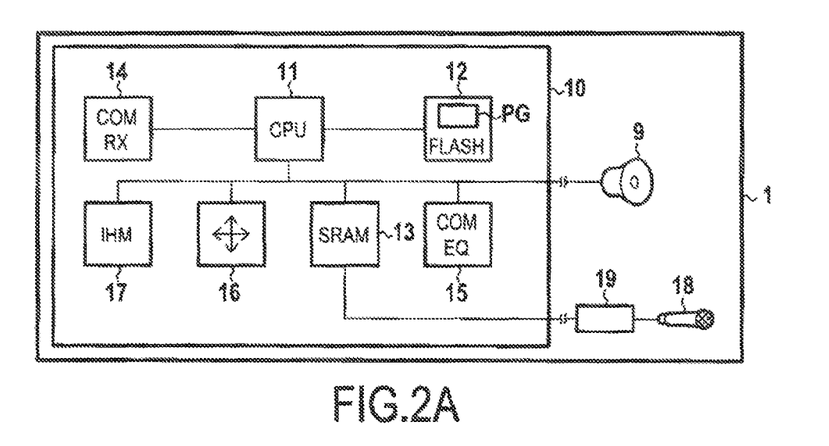
FIG. 2A is a diagram showing the architecture of a receiver including a module suitable for use in a system in accordance with the invention.

FIG. 2A is a diagram of the architecture of a receiver 1 in accordance with the invention, the receiver having a control module 10 in accordance with the invention.

The module 10 presents the conventional architecture of a microcontroller. In particular, it comprises a microcontroller 11, a random access memory (RAM) 13 of the static type (SRAM), and a non-volatile flash memory 12. The non-volatile memory stores a computer program PG having main steps that are described below with reference to FIG. 3, which is in the form of a flow chart.

This module 10 has communication means 14 communicating with receivers, and communication means 15 communicating with at least one piece of equipment.

The module 10 has a configuration zone 16 serving to define the commands that need to be generated as a function of the vector as calculated by the module.

In the first variant of the invention, no reference frame is used, but two commands can be determined by the direction and by the sense of a vector defined by two sound pulses. Since the direction and the sense of the vector are determined as a function of the signs of the differences in travel times between the two sound pulses as received by two receivers, this configuration zone 16 makes it possible to allocate a command to each of the signs.

In the second variant of the invention, this configuration zone 16 serves to determine commands as a function the of directions and possibly of the senses of vectors in a reference frame. These configuration zones 16 are described in greater detail below with reference to FIGS. 5A and 6A in two implementations or this second variant of the invention.

In the presently-described embodiment, the module 10 has a man-machine interface 17 serving in particular to initialize and configure the configuration zone 16. For this purpose, the user can navigate in a menu giving the user the option to select certain particular operating modes and to define various parameters such as the distance between the receivers, for example. The user can also define the positions of pieces of equipment in the reference frame together with the command directions that are associated therewith.

This interface 17 can also serve to launch automatic configuration and initialization routines for the above-mentioned elements from the calculated characteristic instants at which sound pulses issued by the user are received by the receivers, or by pieces of equipment, or by a device internal to the receivers.

The receiver 1 has a sensor suitable in particular for detecting a sound pulse. In the presently-described implementation, this sensor is constituted by a system comprising an omnidirectional microphone 18 (e.g. part No. POM-5238P-R from Projects Unlimited, registered trademark) and signal processor means 19 suitable in particular for shaping, filtering, detecting, and storing the sound pulse in the RAM 13.

In the presently-described implementation, the signal processor means 19 include in particular a bandpass filter that serves to filter out frequencies lower than 3.5 kHz, preferably lower than 4 kHz, and frequencies higher than 15 kHz.

In the presently-described implementation, the receiver 1 includes a sound transducer 9, e.g. a loudspeaker, suitable for being used to generate sound pulses that are useful during an initialization stage to enable the relative positions of the receivers to be detected and to determine the absolute positions of the detectors in the orthonormal reference frame.

Figure 2B:
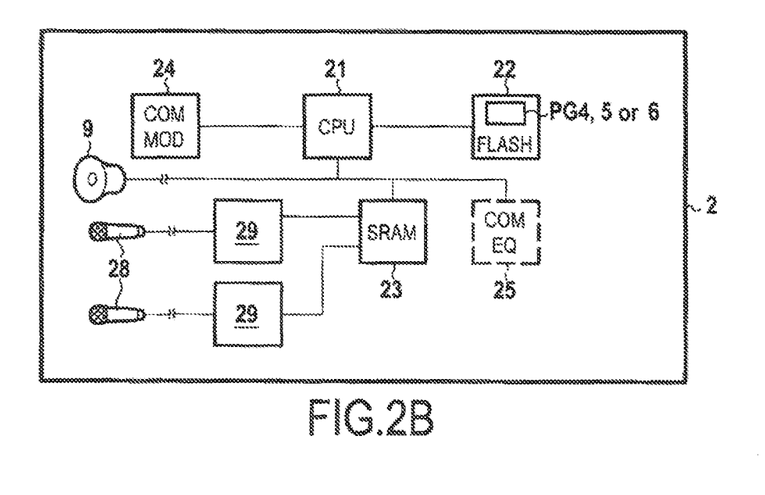
FIG. 2B is a diagram showing the architecture of a receiver suitable for use in a system in accordance with the invention.

FIG. 2B shows another receiver 2, this other receiver being suitable for use in a system in accordance with the invention together with the receiver 1 of FIG. 2A.

In this embodiment, the receiver 2 comprises a microcontroller 21, a non-volatile flash, memory 22, and a RAM of the SRAM type 23, the non-volatile memory 22 including a computer program PG4, PG5, or PG6, depending on the implementation, with the main steps of each of these programs being described below with reference to FIGS. 4B, 5B, and 6B.

In an embodiment, the receiver 2 has communication means 24 for communicating with a piece of equipment. These means 24 are optional, it being possible for the pieces of equipment to be controlled by some other receiver of the system.

The receiver 2 has two channels 28&29, each of these channels being similar to the channel 18&19 described with reference to FIG. 2A and serving to detect, filter, shape, and store a sound pulse in the RAM 23.

This receiver is remarkable in that it does not include a module 10 in the meaning of the invention. The receiver 2 is designed to co-operate with the receiver 1 described above with reference to FIG. 2A within a system in the meaning of the invention. To this end, the receiver 2 has communication means 24 for communicating with the module 10 of FIG. 2A.

In the presently-described implementation, the receiver 2 has a sound transducer 9 for the same purposes as the above-described receiver 1.

Figure 3:
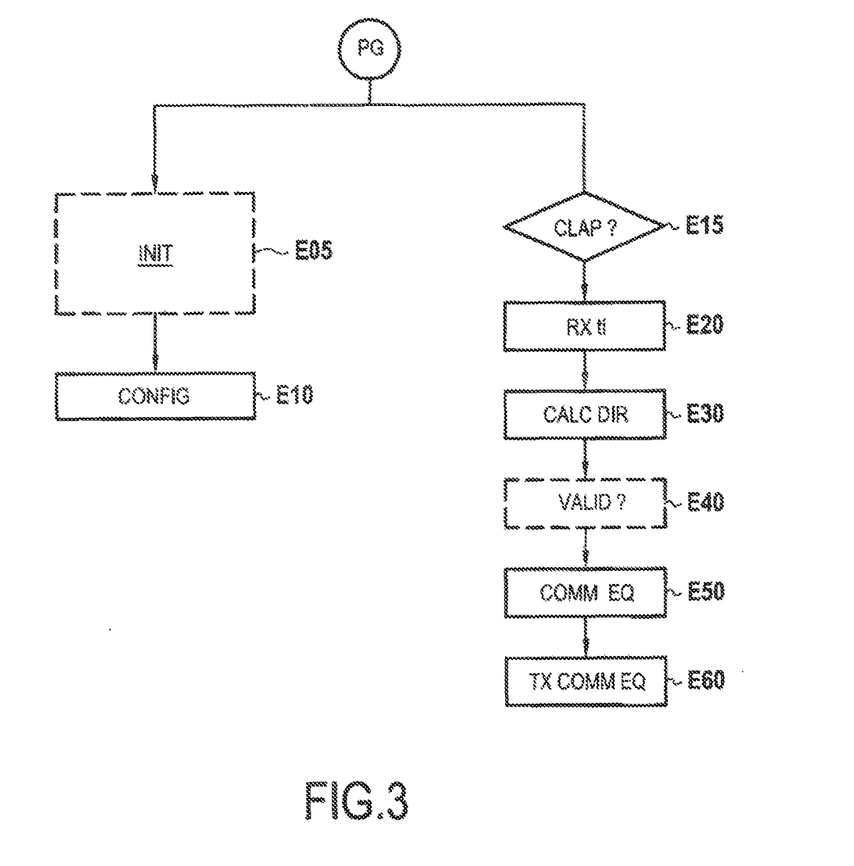
FIG. 3 is a flow chart showing the main steps of a method performed by the module of FIG. 2A.

With reference to FIG. 3, there follows a description of the main steps of a method in accordance with the invention performed by the module 10 of the receiver 1 when the microcontroller 11 of the module executes the program PG stored in the non-volatile memory 12.

In the presently-described implementation, this program has two processes, one corresponding to the preliminary steps of initializing and configuring the module 10, and the other corresponding to the processing sound pulses as such.

In the first variant, in which no reference frame is used, the first process comprises a single "configuration" step E10 for defining the commands in the configuration zone 16.

More precisely, this step E10 consists in allocating one command from a set of two as a function of the sign of the difference between the travel times of two sound pulses from their sources to the two receivers.

Each of these signs corresponds to a sense and to a direction of the vector defined by the positions of the sources of the sound pulses.

For example, this configuration step may define a first command associated with the positive sign, consisting in switching on all the pieces of equipment, and a second command associated with the negative sign consisting in switching off all the pieces of equipment.

In the second variant, in which use is made of an orthonormal reference frame having one of its axes defined by two receivers, this first process includes an initialization step E05 and a configuration step E10.

In the presently-described implementation, the initialization step E05 is a step of determining the absolute position of the receivers in the orthonormal reference frame.

In the second variant, this configuration step E10 consists in determining which commands are to be performed as a function of the directions and optionally of the senses of the vectors. Such a configuration is described in greater detail for the implementations described with reference to FIGS. 5A and 6A.

There follows a description in greater detail of the second process performed by the module 10 of the receiver 1 on detecting a pulse. It is assumed that the module 10 acts during a step E15 to detect a sound pulse, in particular because of the signal processor means 19. This step is described more precisely with reference to FIGS. 4B, 5B, and 6B in three different implementations of the invention.

Normally, when the module 10 detects a pulse, it waits during a step E20 to receive, via its communication means 14, characteristics of the sound pulses as determined by the receivers 2 with which it co-operates.

The pulse detection step E15 and the step E20 of receiving pulse characteristics received by other receivers may be executed for each of the pulses; in a variant, a receiver 2 may communicate the characteristics of two sound pulses to the receiver 1 in one transmission.

The steps E15 and E20 are followed by a step E30 (or E34, E35, E36 depending on the implementation) during which the module 10 determines the direction and possibly also the sense and the norm of the vector defined by two consecutive sound pulses. This step is described in greater detail with reference to FIGS. 4B, 5B, and 6B for three implementations of the invention.

During an optional step E40, the module 10 of the receiver 1 validates the vector as calculated in the preceding step. This step may consist in verifying that the consecutive sound pulses used for calculating the direction are spaced apart in time and in distance within predetermined ranges.

This validation step makes it possible to ignore fortuitous noise that happens to present the characteristics of one or more sound pulses.

In the presently-described implementation, the validation step E40 precedes a step E50 during which the module 10 determines which command to generate as a function of the table stored in the configuration zone 16 and determines the piece of equipment to which the command is to be sent. Various examples are described with reference to FIGS. 4A, 5A, and 6A.

In the presently-described Implementation, during a step E60, the module 10 sends the command as determined during the step E50 to the piece of equipment via its communication means 15.

There follows a more detailed description of certain steps of the method described in general terms with reference to FIG. 3, in three implementations of the invention.

Figure 4A:
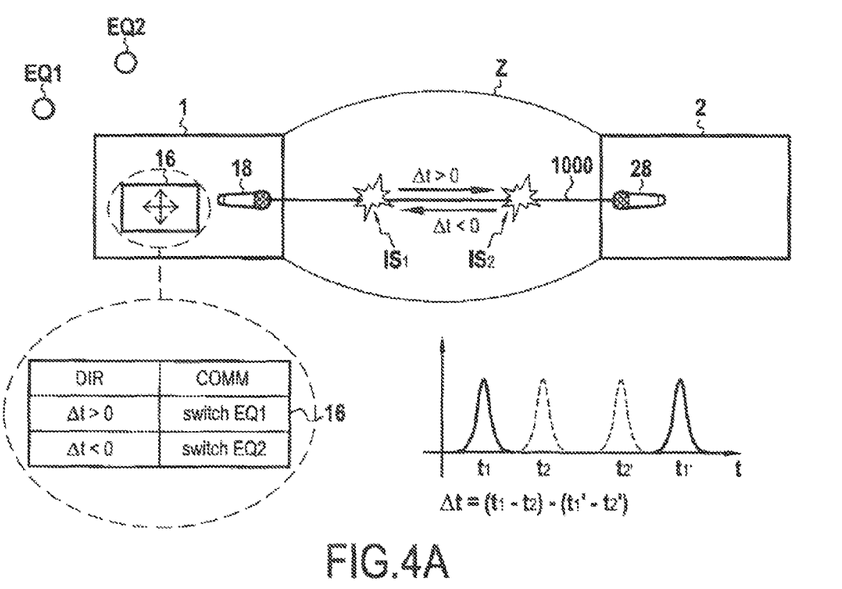
FIG. 4A shows an implementation of the invention in a first variant.
Figure 4B:
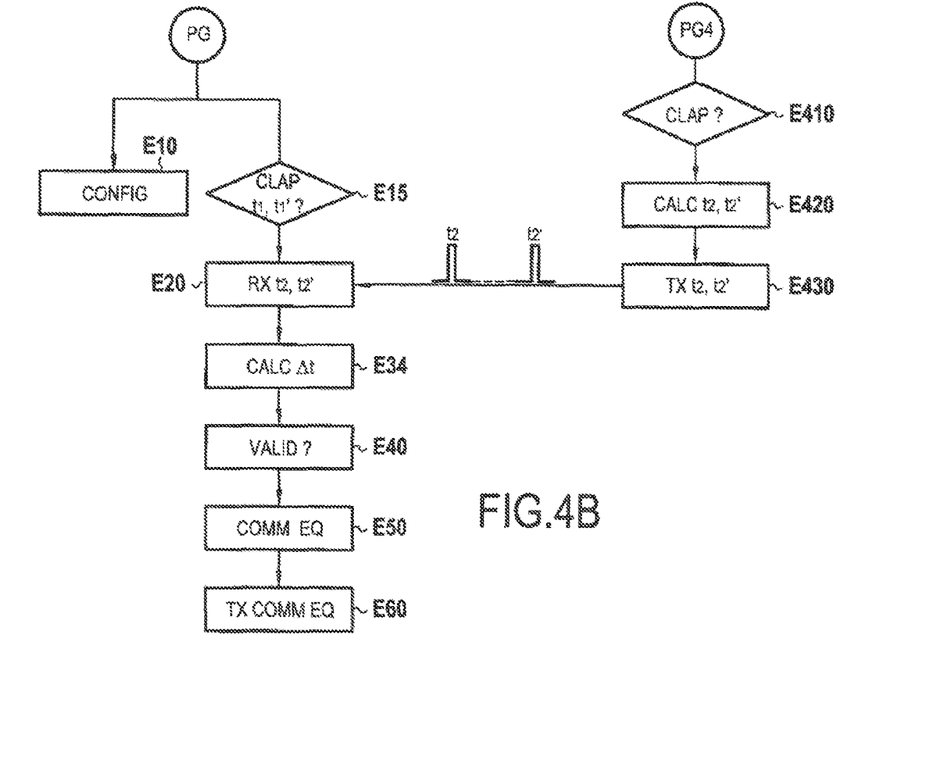
FIG. 4B is a flow chart showing the main steps performed by the receivers in the FIG. 4A configuration.

Description of a First Implementation in Accordance with the First Variant of the Invention (FIGS. 4A, 4B)

In this implementation, the invention is performed by a system comprising a receiver 1 as described with reference to FIG. 2A (first receiver in the meaning of the Invention) and a receiver 2 as described with reference to FIG. 2B (other receiver in the meaning of the invention).

Nevertheless, it should be observed that in this implementation, the receiver 2 has only one sound pulse sensor, in other words only one channel 28&29.

In this first variant, the user needs to be in a zone Z situated between the receivers 1 and 2 on either side of a line 1000 extending between the microphones 18 and 28.

In this example, the receiver 1 is suitable for sending commands to two pieces of equipment EQ1 and EQ2 within the range of its communication means 15.

In the example of FIG. 4A, it is assumed that the receiver 1 is a reference receiver, i.e. a receiver in charge of determining the difference between the travel times of the two sound pulses received by the receivers 1 and 2. In this implementation, each of the receivers 1 and 2 determines characteristic instants at which the sound pulses were received.

More precisely, when the user issues two consecutive sound pulses IS1 and IS2:
  the receiver 1 determines the characteristic instants t1, t1' at which the sound pulses IS1 and IS2 were received;
  the receiver 2 determines the characteristic instants t2, t2' at which the sound pulses IS1 and IS2 were received, and transmits them to the receiver 1;
  the receiver 1 determines a travel time difference $\Delta t$ between the sound pulses IS1 and IS2 received by the two receivers 1 and 2;
  the receiver 1 determines the direction and the sense of the vector defined by the two sound pulses as a function of the sign of the travel time difference $\Delta t$ between the sound pulses of the characteristic instants as determined by the receivers 1 and 2;
  the receiver 1 verifies whether the distance between the two sound pulses is sufficient to discount the possibility of fortuitous noise presenting the characteristics of two consecutive sound pulses; and where appropriate
  the receiver 1 uses the table in the configuration zone 16 to determine one command from the two possible commands, as a function of the sign of this difference.

In this example, when the signal is positive, the on or off state of the equipment EQ1 is changed; when the sign is negative, the on or off state of the equipment EQ2 is changed, with such a change of state being implemented by sending a command to the corresponding piece of equipment EQ1 or EQ2.

With reference to FIG. 4B in the form of flow charts, there follows a description of the main steps performed by the receivers 1 and 2 in this first implementation.

More precisely, the receiver 2 detects, shapes, and stores in its RAM 23 each of the two sound pulses during a step E410.

During a step E420, it determines a characteristic instant t2, t2' for each of these sound pulses.

During a step E430, it transmits these characteristic instants t2, t2' to the module 10 of the reference receiver 1.

In practice, these various steps may be performed sequentially on detecting each sound pulse. Transmitting a characteristic receive instant may consist in sending an electrical (or infrared, or sound) signal when the envelope of the sound pulse exceeds a certain threshold, with it being possible for the reference receiver 1 to determine the travel time differences between each sound pulse by measuring the time difference between receiving this electrical signal and the same electrical signal being generated by its own module 10.

In this first variant, the method performed by the receiver 1 is the same as that described with reference to FIG. 3 concerning the first process.

For the second process it further comprises;

the step E15 of detecting a sound pulse, which is similar to the steps E410 and E420 performed by the receiver 2 as described above. They enable the receiver 1 to determine the characteristic instants t1 and t1' at which the two sound pulses were received;

the step E20 consists in receiving the characteristic instants t2 and t2' sent by the receiver 2 in step E430; general step E30 consists in a step E34 of determining the direction and the sense of the vector defined by the two sound pulses, this direction and sense being determined by the sign of the travel time difference, $$\Delta t = (t1-t2)-(t1'-t2')$$

the validation step E40 consists in verifying whether the two detected pulses are sufficiently spaced apart in distance. For this purpose, it is verified whether the travel time difference $\Delta t$ multiplied by the propagation speed of sound in air lies in a predetermined range of distances, here a distance greater than several tens of centimeters and less than about one meter fifty; and the steps E50 of determining the equipment command and E60 of sending that command to the equipment are identical to those described above with reference to FIG. 3.

Figure 5A:
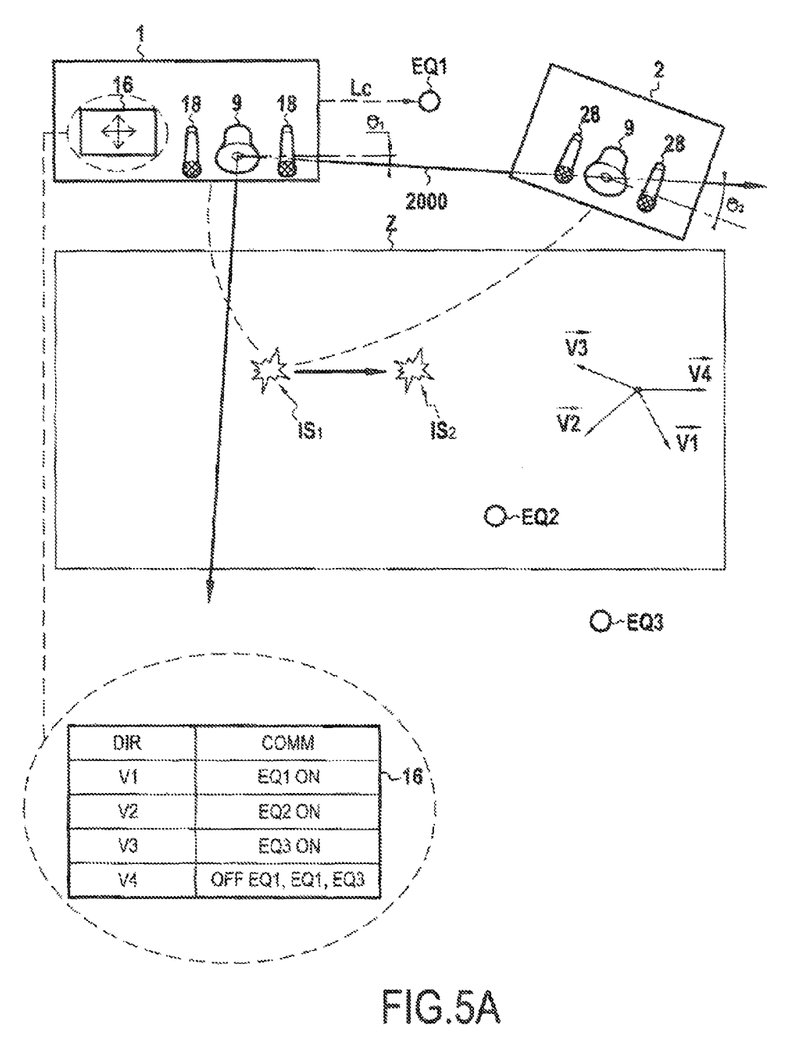
FIG. 5A shows an implementation of the invention in a second variant.
Figure 5B:
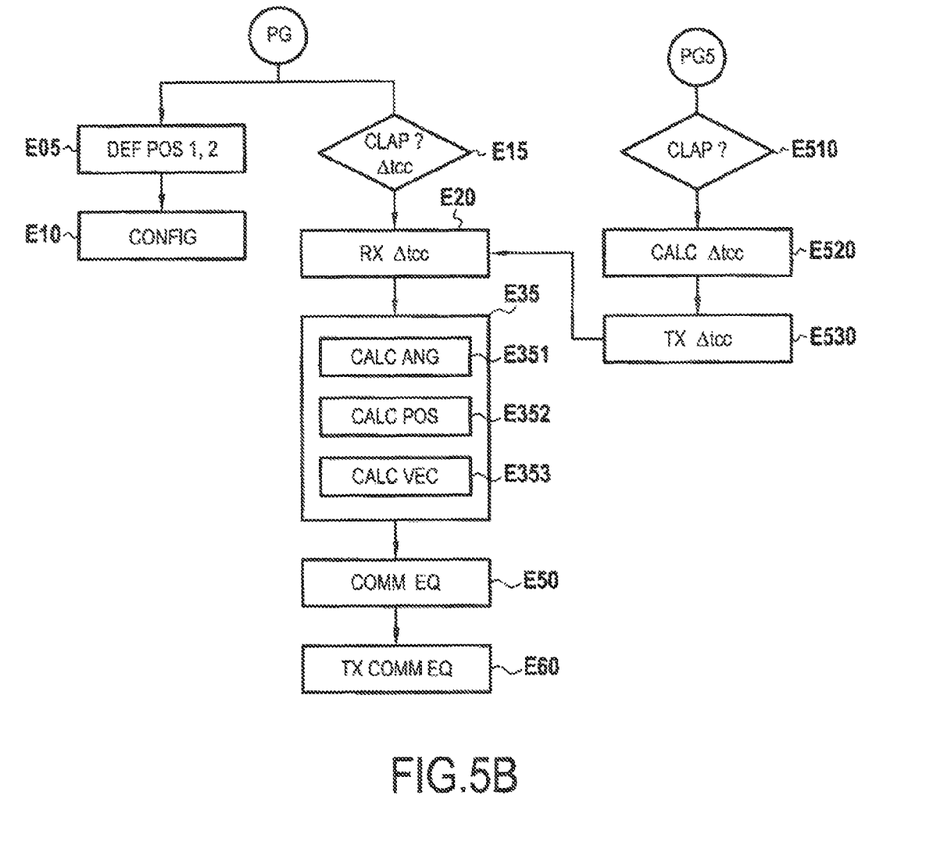
FIG. 5B shows the main steps of the method performed in the receiver of FIG. 5A.

Description of a Second Implementation in Accordance with the Second Variant of the Invention (FIGS. 5A, 5B)

In this implementation, the configuration of the control system is described with reference to FIG. 5A.

In this implementation, use is made of a receiver 1 as described with reference to FIG. 2A with the exception that it has two sound pulse sensors, i.e. two channels 18&19 and a receiver 2 as described with reference to FIG. 2B, i.e. having two sensors.

In this example, the orthonormal reference frame 2000 is defined by the axis passing through the receivers 1 and 2 with the receiver 1 acting as the origin of the reference frame. The second axis is perpendicular to the first axis and has its origin at the receiver 1, being directed towards the zone Z in which sound pulses are to be emitted. In the presently-described implementation, the receivers selected for defining an axis of the orthonormal reference frame and its origin have already been selected by selecting a particular mode of operation during the initialization stage.

In this example, the receiver 1 also has a sound transducer 9 placed close to the sensor (18&19). This sound transducer is used during the initialization step E05 and serves to calculate automatically the distance between the receivers and also the orientation of the receiver 2 relative to the origin receiver 1. It is explained below that it is necessary to know the orientation of the receivers in order to be able to determine the positions of the sound pulses in the orthonormal reference frame 2000.

In this example, the receiver 1 is suitable for controlling three pieces of equipment EQ1, EQ2, and EQ3. More precisely, this implementation of the invention makes it possible to define four commands as a function of four senses and four directions of vectors referenced v1, v2, v3, and v4 in FIG. 5A.

To this end, the configuration zone 16 of the module 10 has a table associating one command with each of the four vectors v1 to v4:

switch on the equipment EQ1 when the vector is in the direction and the sense of v1;

switch on the equipment EQ2 when the vector is in the direction and the sense of v2;

switch on the equipment EQ3 when the vector is in the direction and the sense of v3; and switch off all the pieces of equipment EQ1, EQ2, and EQ3 when the vector is in the direction and the sense of v4.

With reference to FIG. 5B, there fellows a description of the methods performed by the receivers 1 and 2 in FIG. 5A.

In this implementation, it is fundamental to observe that each of the two receivers has two sound pulse sensors respectively (18&19) and (28&29).

The method performed by the receiver 2 for each of the pulses detected by this receiver comprises:

a step E510 similar to above-described step E410, during which each of the two sensors detects, shapes, and stores the pulse in the RAM 23;

a step E520 during which the microcontroller 21 reads the two signals stored for the sound pulse and uses a cross-correlation method to determine the time difference $\Delta t_{cc}$ between the two signals. This time difference corresponds to the difference between the travel times for the sound pulse as detected by the two sensors of a single receiver; and a step E530 of transmitting this time characteristic $\Delta t_{cc}$ to the receiver 1.

At this point, only the travel time difference for a single sound pulse reaching the two sensors (28&29) of the receiver 2 is transmitted. There follows a description of the main steps of the method performed by the receiver 1 in this implementation.

This method comprises a first process, which first process comprises a step E05 of defining the positions of the receivers 1 and 2 and a step E10 of configuring commands. During the step E05, the sound transducer 9 associated with the receiver 1 and positioned between the two sensors emits a characteristic noise that is detected by the other receiver. The time difference between emitting the characteristic noise at the receiver 1 and the average of the reception times of the characteristic noise at the two sensors of the receiver 2 serves to determine the distance between the receivers. The time difference between the two sensors (28&29) of the receiver 2 serves to calculate the angle $\theta 2$ of this receiver relative to the axis passing via the receivers 1 and 2, given that the distance between the two sensors of a single receiver is known. In the same manner, a characteristic noise is emitted by the sound transducer 9 associated with the receiver 2 in order to obtain the angle $\theta 1$ of the receiver 1. During the step E10, the directions and the senses of the vectors associated in particular with the pieces of equipment are entered into the table of the configuration zone 16.

The second process of this method is performed on the module 10 detecting a pulse. In general manner, this process is similar to that described above for the receiver 2 concerning the step E15 of detecting a pulse.

More precisely, in this implementation, a pulse is detected by each of the sensors (18&19) detecting, shaping, and storing the data of a pulse in the RAM 13, the microcontroller 11 determining a time difference $\Delta t_{cc}$ between these two signals by cross-correlation. The step E20 performed by this receiver 1 consists in receiving the time difference obtained by the receiver 2 by cross-correlation during the above-described step E520. The step E35 of calculating the direction of the vector from its coordinates is described below in greater detail.

In the presently-described implementation, this step comprises three substeps E351, E352, and E353. During the step E351, the microcontroller 11 acts for each sound pulse on the basis of each time difference $\Delta t_{cc}$ measured by one of the receivers to calculate a curve as shown. This curve shows the possible positions of the sound pulse for which the difference between the received instants of the pulse by the two sensors is equal to $\Delta t_{cc}$. During the step E352, the microcontroller 11 calculates the point of intersection between the two previously-determined curves. Since the positions and the orientations of the receivers 1 and 2 in the reference frame 2000 are known, the microcontroller 11 can deduce therefrom the position of each, sound pulse. Thereafter, the microcontroller 11 acts during a step E353 to calculate the coordinates of the vector formed by the two sound pulses on the basis of the positions of the two sound pulses in the reference frame 2000.

The step E50 of determining the command and the equipment, and the step E60 of sending the command to the equipment being commanded are similar to those described above with reference to FIG. 3.

Figure 6A:
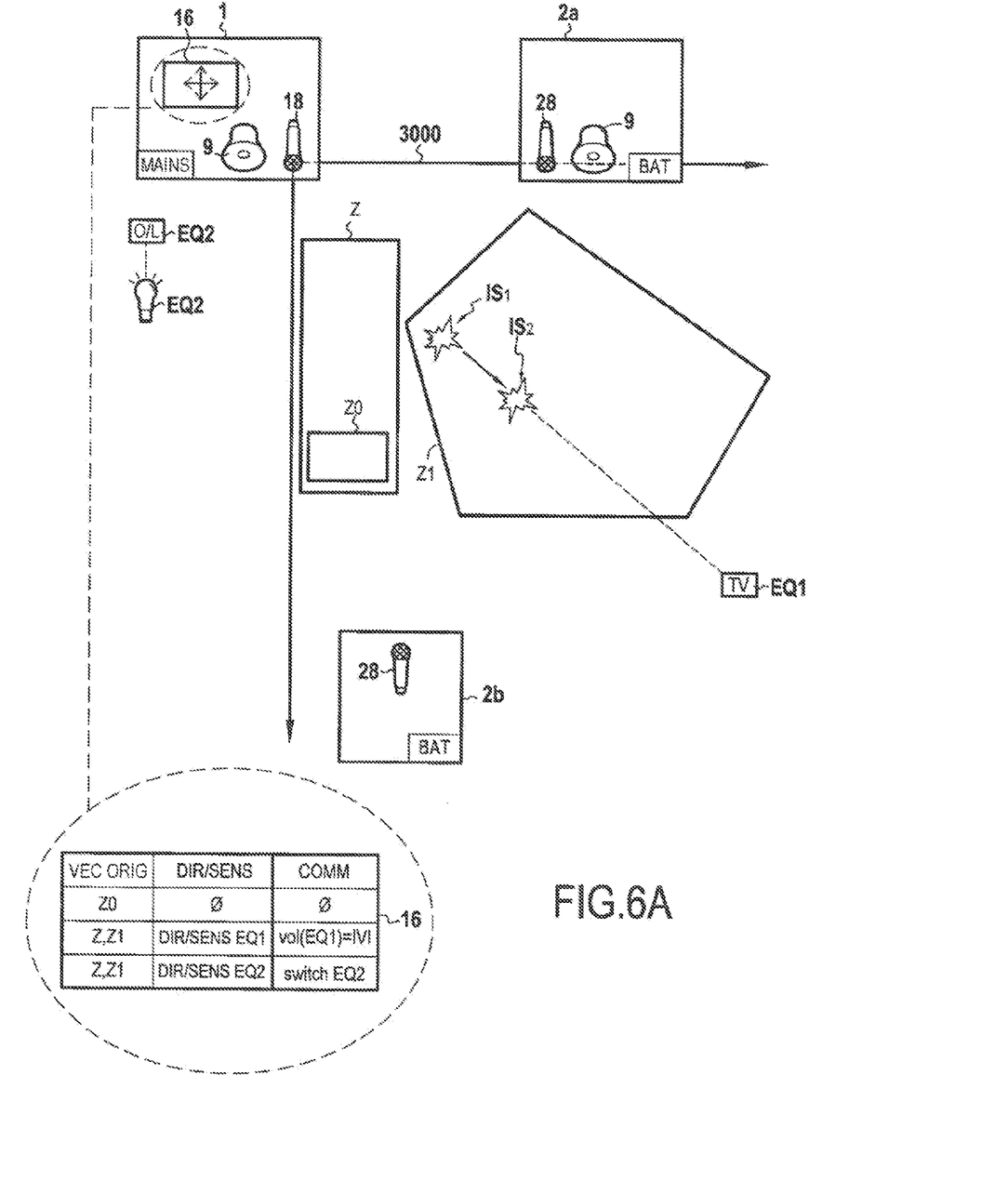
Figure 6B:
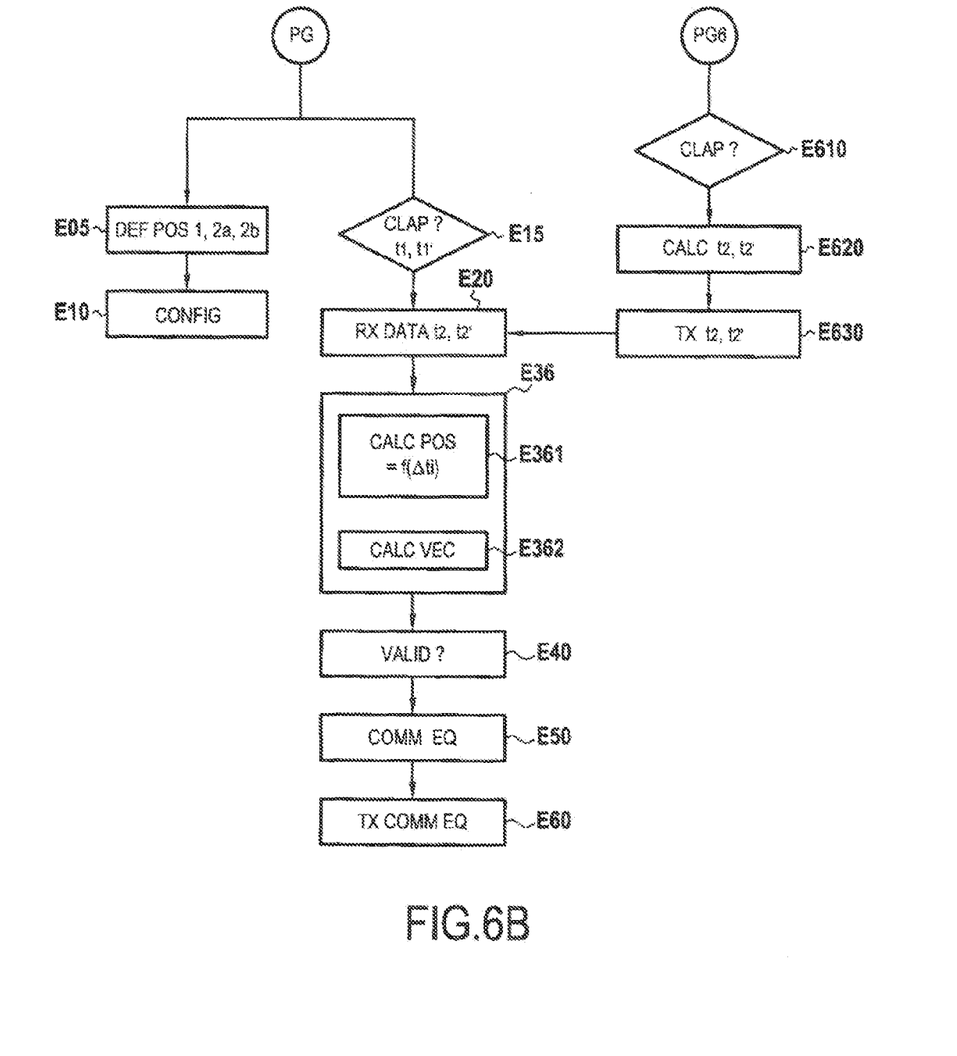
Figure 6C:
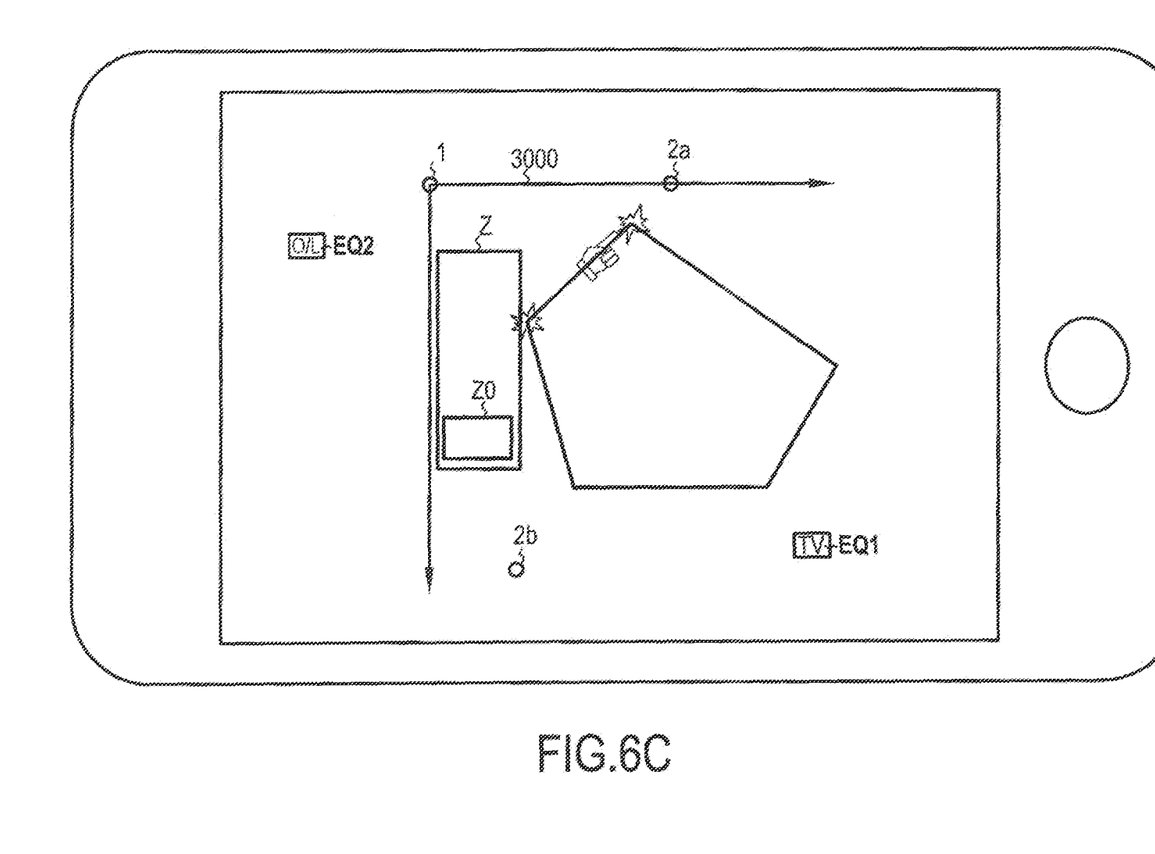

Description of a Third Implementation in Accordance with the Second Variant of the Invention (FIGS. 5A, 6B, 6C)

In this implementation, the invention is performed by a system comprising a receiver 1 as described with reference to FIG. 2A (first receiver in the meaning of the invention), and two receivers 2a and 2b as described with reference to FIG. 2B (other receivers in the meaning of the invention).

In this example, the receiver 1 is mains-powered while the receivers 2a and 2b are battery-powered.

Nevertheless, it should foe observed that in this implementation, each of the receivers 1, 2a, and 2b has only one sound pulse sensor (28&29).

In this example, the sound emissions are potentially taken into account only if they are emitted in one of two zones Z and Z1. Each of these two zones is associated with the same table in the configuration zone 16. Nevertheless, is should be observed that it is possible to associate a different table of the configuration zone IS with each of the possible sound emission zones.

In accordance with the second variant of the invention, the receivers define an axis of the orthonormal reference frame 3000. In similar manner to the above-described implementation, the receivers constituting one of the axes of the orthonormal reference frame 3000 are defined by default by the module 10. In this example, the two receivers defining one of the two axes of the reference frame are the receivers 1 and 2a; the receiver acting as the origin of the reference frame is the receiver 1.

In this example, the commands to be executed depend on the piece of equipment to which the vector points. It is therefore necessary during the step of configuring the module 10, to determine the position of each piece of equipment. The positions of the pieces of equipment may be recognized automatically by the system if the user emits sound pulses from the proximity of these pieces of equipment during the configuration step 10. Under such circumstances, a portion of the second process associated with detecting sound pulses and calculating their position is performed. This step is described in greater detail below.

In this example, and with reference to FIG. 6A, one of the pieces of equipment to be controlled is a command reception and processor outlet (EQ2) having a function of receiving a command emitted by the module 10. After receiving a command, the command receiver and processor outlet analyzes the command it has received and as a function thereof it controls one or more secondary pieces of equipment; in the example shown in FIG. 6A, it controls a lamp. The use of this command receiver and processor outlet makes it possible in particular to control pieces of equipment that are not located in the proximity of the user.

In this example, the origin of the vector, i.e. the position of the first sound pulse, is also taken into account. If the vector has its origin in a zone Z0, no command is allocated thereto. This makes it possible to exclude zones that are too noisy. If the vector does not originate in the zone Z0, but in the remainder of the zone 2 or in the zone Z1, the sense to which the vector points serves to select which piece of equipment to control.

In this example, the norm of the vector is also taken into account when controlling certain pieces of equipment. Thus, with reference to FIG. 6A, if the direction and the sense of the vector determines the command "change volume" for application to the piece of equipment 1, then the norm of the vector defines the intensity of the command, i.e. the sound level to be reached.

With reference to FIG. 6B, in the form of flow charts, there follows a description of the main steps performed by the receivers 1, 2a, and 2b in this third implementation.

The program PG6 is performed in the same manner by the receivers 2a and 2b on detecting a sound pulse during step E610. During this step, the receiver 2a (or 2b) detects, shapes, and stores in its RAM 23 the two sound pulses. It should be observed that the signal processor means 29 also make it possible, when storing a pulse, to store a reference time for the beginning of pulse detection.

During the step E620, the characteristic receive instant for each sound pulse is determined by the microcontroller 21 after re-reading pulses stored in the memory 23 and the reference times for the beginning of detection for each pulse.

During a step E630, each receiver (2a or 2b) transmits the characteristic receive instants of the two sound pulses to the receiver 1.

In an implementation, the receivers 1, 2a, and 2b are synchronized. In a variant, when the receivers are not synchronized, the receiver 2a or 2b sends the difference between the characteristic instants after a determined time delay measured from detecting the second sound pulse. Since this time delay is known to the receiver 1, it can determine the travel time difference associated with each pulse.

There follows a description of the main steps of the method performed by the receiver 1.

This method has a first process with an initialization step E05 and a configuration step E10.

During the step E05 of determining the absolute positions of the receivers in the orthonormal reference frame 3000, the sound transducer 9 of the receiver 1 emits a characteristic noise that is detected by all of the receivers. In this example, since the receivers are synchronized, the characteristic instants at which the characteristic noise is received by each of the receivers make it possible to calculate the absolute positions of the receivers in the reference frame. The travel time difference between the receiver 1 and receiver 2a makes it possible to determine the abscissa position of the receiver 2a; the receiver 1 defining the origin of the reference frame. The travel time difference between the receiver 1 and the receiver 2b is used subsequently for calculating the absolute position of the receiver 2b in the reference frame 3000. The sound transducer 9 of the receiver 2a also emits a characteristic noise that is detected by the other receivers, thus making it possible in particular to determine the distance between the receivers 2a and 2b. The coordinates of the receiver 2b in the reference frame 3000 are determined with the help of trigonometrical relationships making use of the distances between the receivers 1 and 2a, 1 and 2b, and 2a and 2b.

In an implementation, during the configuration step E10, the positions of the pieces of equipment are determined by automatic measurement after the user has emitted a sound pulse in the proximity of each piece of equipment. For this purpose, steps E15 to E361 of the program PG are executed, the program PG also using the characteristic receive instants of the sound pulses transmitted by the receivers 2a and 2b during the steps E610 to E630. The zone Z0 for which a sound pulse command is not taken into account, and also the zones Z and Z1 may also be defined in similar manner by emitting sound pulses at the boundaries of these zones. The zones are then defined as the convex envelope defined from the associated sound pulses. During this configuration step, the commands associated with the pieces of equipment are also defined and stored in the table of the configuration zone 16. In a variant, during the configuration step E10, the positions of the pieces of equipment are determined with the help of a man-machine interface, such as a tablet or a smart phone associated with computer functions. For this purpose, the absolute positions of the receivers in the orthonormal reference frame 3000 are presented on the screen of the smartphone and the user informs the man-machine interface means of the smartphone about the positions of the pieces of equipment and the positions of the boundaries of the zones Z0, Z, and Z1. By way of example, the boundaries of the zones Z0, Z, and Z1 may be defined as respective polygons. FIG. 6C is a diagram showing the screen of a smartphone while defining the position of the zone Z1 when the man-machine interface is the touch screen of the smartphone.

The program PG also has a second process for controlling the pieces of equipment as a function of the coordinates of the vector obtained from the positions of the sound pulses as received by the detectors 1, 2a, and 2b.

Step E15 of detecting two sound pulses is similar to above-described step E610. This step also includes a step of calculating a characteristic of the sound pulses. In this example, this step consists in calculating characteristic receive instants in accordance with above-described step E620.

During the step E20, the microcontroller 11 receives the difference between the characteristic receive instants of two sound pulses IS1 and IS2 via its communication means 14 for communicating with the two receivers 2a and 2b. In this example, since the receivers 1, 2a, and 2b are synchronized, communicating the characteristic receive instants of each pulse suffices. In a variant, when the receivers are not synchronized, the receivers 2a or 2b send the difference between the characteristic instants after a respective predetermined time delay measured from detecting the second sound pulse. Since these time delays are known to the receiver 1, it can determine the travel time difference associated with each pulse.

Step E36 of determining the coordinates of the vector is made up of two steps E361 and E362. During the step E361, the microcontroller 11 uses the characteristic instants at which each pulse was received by each of the receivers to calculate the positions of each of the pulses.

The use of characteristic receive instants of sound pulses for the purpose of calculating their positions is known in the prior art and corresponds to a conventional triangulation method such as that described in U.S. Pat. No. 6,630,618.

During step E362, the coordinates of the vector formed by the sound pulses are calculated from the positions of the sound pulses in the reference frame 3000 as determined during the preceding step.

During the validation step E40, the microcontroller 11 verifies whether the spacings in time and position between the two pulses lie within ranges of predefined values. For this purpose, the microcontroller makes use of the coordinates of the vector and the time interval between the two pulses being received by a single receiver. In this receiver, the time interval between the two pulses is calculated by taking account of the difference between the characteristic receive instants as transmitted to the receiver 1 by one of the two receivers 2a or 2b and the positions of the corresponding pulses in the reference frame.

During the step E50 of determining the command, the microcontroller 11 uses the table in the configuration zone 16 to determine whether the origin of the vector formed by the two sound pulses lies in the zone Z0. If so, no command is allocated to such a vector. In contrast, if the origin of the vector does not lie in the zone Z0, but lies within the remainder of the zone Z or within the zone Z1, the microcontroller 11 verifies whether one of the pieces of equipment lies on the directed line defined by the vector; this directed line has as its origin the origin of the vector, i.e. the position of the first sound pulse and it has the same direction and the same sense as the vector. Under such circumstances, the equipment to which the vector points is controlled.

During the step E60, the commands are sent to the pieces of equipment via the communication means 15 of the module 10.

Other Implementations

In the above-described implementations, commands associated with one or more characteristics of the vector as determined by two sound pulses are used to control pieces of equipment directly or to control a command reception and processor outlet. Naturally, the commands as determined in this way may also be associated in another implementation with managing a user interface (navigating in menus, selecting, . . . ) available on a piece of equipment or a command reception and processor outlet. The user interface may itself make it possible to control secondary pieces of equipment.

In the above-described embodiment, the receivers 2, 2a, and 2b transmit a characteristic of the sound pulse to the receiver 1 that includes the module. In a particular embodiment, the module 10 of the receiver 1 (first receiver in the meaning of the invention) may also send a characteristic of the sound pulse to the receivers 2, 2a, and 2b (other receiver in the meaning of the invention). Under such circumstances, each of the receivers also has a configuration zone 16 and directly controls pieces of equipment associated therewith.

In the above-described embodiment, only the receiver 1 (first receiver in the meaning of the invention) is mains-powered. Depending on the requirements for power and for endurance, it is also possible in other embodiments to envisage powering the receivers 2a and 2b (other receivers in the meaning of the invention) from mains. In like manner, all of the receivers could be battery-powered.

In the above description, the communication means 15 for communicating with the equipment are incorporated in the module 10; naturally, these means for communicating with the equipment could be external to the module 10, i.e. incorporated in the receiver that incorporates the module, or indeed incorporated in some other receiver of the system.

In one of the above-described embodiments, the signal processor means 19 comprise a bandpass filter. In a variant, it is possible to use a highpass filter for blocking frequencies lower than 3.5 kHz, preferably lower than 4 kHz, or a lowpass filter for passing frequencies lower than 15 kHz, for example.

The invention claimed is:

1. A method of controlling pieces of equipment by sound pulses, the method comprising:
    determining positions of at least two receivers in a reference frame by calculating characteristic instants at which a characteristic noise is received at the at least two receivers, wherein the characteristic noise is emitted by a user;
    determining at least a direction of a vector defined by two sound pulses received by the at least two receivers, said two sound pulses being generated in a zone that is defined relative to said at least two receivers; and
    issuing a command determined at least by the direction of said vector, wherein the command serves to control at least one piece of equipment that is positioned independently of the at least two receivers.

2. A method according to claim 1, further comprising:
    validating said vector on the basis of a distance and a time offset between said two sound pulses.

3. A method according to claim 1, wherein the method is performed by two receivers, one of which constitutes a reference receiver, each receiver of the two receivers having a sound pulse sensor.

4. A method according to claim 1, wherein the positions of the at least two receivers and of the two sound pulses, and the direction of the vector, are determined in an orthonormal reference frame having an axis that is defined by the at least two receivers.

5. A method according to claim 4, further comprising:
    defining the positions of the pieces of equipment in the orthonormal reference frame.

6. A method according to claim 5, wherein the defining further includes:
    defining a subzone of said zone in which said two sound pulses are not taken into account.

7. A method according to claim 6, wherein said subzone is defined as a result of:
    a user emitting sound pulses or characteristic noises,
    receiving, by each of said at least two receivers, said sound pulses or said characteristic noises, and
    calculating the positions of said sound pulses or said characteristic noises in said orthonormal reference frame.

8. A method according to claim 4, wherein coordinates of said vector are determined by using sound signals received by the at least two receivers, each having two sound pulse sensors.

9. A method according to claim 4, wherein coordinates of said vector are determined by using sound signals received by at least three receivers, each having at least one sensor.

10. A method according to claim 1, further comprising:
    filtering said two sound pulses with at least one highpass filter having its cutoff frequency higher than or equal to 3.5 kHz, or a lowpass filter having its cutoff frequency selected as a function of an ambient noise for discrimination in a medium.

11. A method according to claim 1, wherein the direction of the vector is defined independently of a position of the at least one piece of equipment.

12. A module for controlling pieces of equipment by sound pulses, which module is suitable for being incorporated in a receiver, the module comprising:
    means for communicating with another receiver;
    means for determining at least a direction of a vector defined by two sound pulses received by said receiver and said another receiver, said two sound pulses being generated in a zone defined by said receiver and said another receiver, said pieces of equipment being positioned independently of said receiver and said another receiver; and
    means for determining a command for at least one piece of equipment, the command being determined by at least the direction of said vector; and
    a command reception outlet for receiving commands emitted by the module, the command reception outlet including:
    means for communication with said module;
    means for interpreting a command emitted by said module; and
    means for controlling at least one secondary piece of equipment capable of receiving communications from said command reception outlet.

13. A system for controlling pieces of equipment by sound pulses, the system comprising:
    a first receiver; and
    at least one other receiver;
    wherein the first receiver comprises:
        at least one sound pulse sensor;
        a first microcontroller comprising one or more processing units and one or more processor-readable media, wherein the one or more processor-readable media of the first microcontroller contain instructions that, when executed by a processing unit of the one or more processing units of the first microcontroller, cause the processing unit of the first microcontroller to perform operations for controlling pieces of equipment by sound pulse, the operations comprising:
            communicating with the at least one other receiver; and
            determining at least a direction of a vector defined by two sound pulses received by said first receiver and said at least one other receiver, said two sound pulses being generated in a zone defined by said first receiver and said at least one other receiver, said pieces of equipment being positioned independently of said first receiver and said at least one other receiver; and
    wherein said at least one other receiver comprises:
        at least one sound pulse sensor;
        a second microcontroller comprising one or more processing units and one or more processor-readable media, wherein the one or more processor-readable media of the second microcontroller contain instructions that, when executed by a processing unit of the one or more processing units of the second microcontroller, cause the processing unit of the second microcontroller to perform operations comprising:
            determining a characteristic of said sound pulse; and
            transmitting information obtained from the characteristic to said first receiver.

14. A system for controlling pieces of equipment by sound pulses according to claim 13, further comprising at least one command reception outlet for receiving commands, the outlet comprising:
    a third microcontroller comprising one or more processing units and one or more processor-readable media, wherein the one or more processor-readable media of the third microcontroller contain instructions that, when executed by a processing unit of the one or more processing units of the third microcontroller, cause the processing unit of the third microcontroller to perform operations comprising:
   communicating with said receiver;
   interpreting a command emitted by said receiver; and
   controlling at least one secondary piece of equipment capable of receiving communications from said outlet.

15. A method of controlling pieces of equipment by sound pulses, the method comprising:
   emitting a characteristic noise at at least one receiver of at least two receivers;
   determining positions of the at least two receivers in a reference frame by calculating characteristic instants at which said characteristic noise is received at the at least one receiver
   determining at least a direction of a vector defined by two sound pulses received by the at least two receivers, said two sound pulses being generated in a zone that is defined relative to said at least two receivers, wherein the positions of the at least two receivers and of the two sound pulses, and the direction of the vector, are determined in an orthonormal reference frame having an axis that is defined by the at least two receivers; and
   issuing a command determined at least by the direction of said vector, wherein the command serves to control at least one piece of equipment that is positioned independently of the at least two receivers.

16. A method according to claim 15, wherein said characteristic noise is emitted by a device internal to each of said at least two receivers.

* * * * *